(12) United States Patent
Hallström

(10) Patent No.: US 8,015,941 B2
(45) Date of Patent: Sep. 13, 2011

(54) SYSTEM AND METHOD FOR ADJUSTMENT OF A MILKING LOCATION

(75) Inventor: Anders Hallström, Haninge (SE)

(73) Assignee: Delaval Holding AB, Tumba (SE)

( * ) Notice: Subject to any disclaimer, the term of this patent is extended or adjusted under 35 U.S.C. 154(b) by 234 days.

(21) Appl. No.: 12/448,431

(22) PCT Filed: Dec. 21, 2007

(86) PCT No.: PCT/SE2007/051082
§ 371 (c)(1),
(2), (4) Date: Jul. 20, 2009

(87) PCT Pub. No.: WO2008/079096
PCT Pub. Date: Jul. 3, 2008

(65) Prior Publication Data
US 2010/0012039 A1    Jan. 21, 2010

(30) Foreign Application Priority Data
Dec. 22, 2006 (SE) ...................................... 0602828

(51) Int. Cl.
*A01J 5/003* (2006.01)
(52) U.S. Cl. .................... 119/14.02; 119/14.03; 119/570
(58) Field of Classification Search ............... 119/14.02, 119/14.03, 752, 740, 756, 570
See application file for complete search history.

(56) References Cited

U.S. PATENT DOCUMENTS

| | | | | |
|---|---|---|---|---|
| 3,448,725 A | | 6/1969 | Holm et al. | |
| 4,508,059 A | * | 4/1985 | Anderson | 119/14.03 |
| 4,951,608 A | * | 8/1990 | Reisgies et al. | 119/14.03 |
| 5,069,160 A | * | 12/1991 | Street et al. | 119/14.08 |
| 5,469,808 A | | 11/1995 | Street et al. | |
| 5,950,562 A | * | 9/1999 | Schulte et al. | 119/51.02 |
| 6,394,027 B2 | * | 5/2002 | Gallagher et al. | 119/14.03 |
| 7,246,572 B1 | * | 7/2007 | Wade | 119/516 |

FOREIGN PATENT DOCUMENTS

| | | |
|---|---|---|
| EP | 0 188 303 A1 | 7/1986 |
| EP | 0 191 517 A1 | 8/1986 |
| EP | 0 194 729 A1 | 9/1986 |
| EP | 0 432 148 A2 | 6/1991 |
| EP | 0 451 906 A1 | 10/1991 |
| EP | 0 432 148 B1 | 8/1997 |
| EP | 1 250 837 A2 | 10/2002 |

OTHER PUBLICATIONS

International Search Report dated Mar. 26, 2008.

* cited by examiner

*Primary Examiner* — Yvonne R. Abbott
(74) *Attorney, Agent, or Firm* — Harness, Dickey, Pierce, P.L.C.

(57) ABSTRACT

The present invention relates to a system (10) for automatic adjustment of at least one interior dimension of a milking location (12) for an animal. The milking location (12) comprises an enclosure formed by e.g. four confining means ($12_1, \ldots, 12_4$), whereby at least one of the confining means ($12_1, \ldots, 12_4$) is movable. The system (10) comprises a first sensor means (14) operable to detect the presence of an animal In the milking location (12). The system (10) also comprises a control means (18) connected to the first sensor means (14), When an animal is detected in the milking location (12), the control means (18) is operable to move the at least one movable confining means ($12_1, \ldots, 12_4$) stepwise, in order to adjust the at least one interior dimension of the milking location (12) to the animal.

23 Claims, 8 Drawing Sheets

SYSTEM AND METHOD FOR ADJUSTMENT OF A MILKING LOCATION

FIELD OF THE INVENTION

The present invention relates, in a first aspect, to a system operable to automatically initiate a milking location for an animal by automatic adjustment of at least one interior dimension of the milking location.

According to a second aspect, the present invention relates to a method for automatic initiation of a milking location for an animal by automatic adjustment of at least one interior dimension of the milking location.

According to a third aspect the present invention relates to at least one computer program product for automatic initiation of a milking location for an animal by automatic adjustment of at least one interior dimension of the milking location for an animal.

BACKGROUND OF THE INVENTION

The patent document U.S. Pat. No. 3,448,725 relates to an adjustable milking stall for dairy cows where the stall has a stationary rear wall adjacent to a milking station, and adjustable means either in the form of an adjustable front wall or an adjustable manger movable toward the rear wall to shorten the stall for cows of different length. Additionally, the width of the stall may be adjusted for cows of different width. These adjustments of the milking stall are performed manually in that they require an operator to perform actions in real-time. As it is stated in this document, the hydraulic cylinders, which control the movement of the manger, may be remotely controlled by an operator from a console in the milking pit.

A disadvantage with the solution presented in the document U.S. Pat. No. 3,448,725 is that it is labour-intensive, and consequently rather expensive, due to the fact that it requires manual actions performed by an operator in real-time.

The patent document EP-B1-0 432 148 relates to a milking location for an animal, comprising an enclosure formed by fences which can be opened for allowing the animal to enter the milking location on the tail-side or to leave the milking location on the head-side and closed to restrain the animal during milking, whereby the enclosure includes at the head-side a movably mounted front-fence which may be used as a feed trough and at the tail-side a back-fence, the milking location further comprising a set of milking cups movable relative to a fixed position of the enclosure and to be applied to the teats of the udder of the animal to be milked, a recognition device for automatic identification of the animal entered into the enclosure and control means for controlling the operation of the milking location, thereby making use of stored information and the identification of the animal by the recognition device. The back-fence is in a fixed position relative to the length of the enclosure and a feed trough near the front-fence is connected to a positioning device that is adapted to adjust the length of the enclosure between the back-fence and the front-fence and the feed trough in accordance with the length of the animal to be milked. The length of the enclosure is adapted to the known length of the animal stored in the control means.

A disadvantage with the solution presented in the document EP-B1-0 432 148 is that it requires a manual initiation of the system in order to thereafter make use of what is called historical data about the animals, i.e. the length of each animal. Another disadvantage is that it does not take into account that different animals can have different sizes, not only different lengths.

SUMMARY OF THE INVENTION

The above mentioned problems are solved with a system operable to automatically initiate a milking location for an animal by automatic adjustment of at least one interior dimension of the milking location according to claim 2. The milking location comprises an enclosure formed by n confining means, whereby n is an integer, and n≧1, whereby at least one of the confining means is movable. The system comprises a first sensor means operable to detect the presence of an animal in the milking location, and a control means connected to the first sensor means. The system also comprises a second sensor means connected to the control means, and operable to detect a part of the animal. The control means is operable, when the presence of an animal in the milking location is detected, to move the at least one movable confining means iteratively in steps until the second sensor means detects that the position of the animal is within desired limits.

An advantage with the system according to the present invention is that it is automatic, i.e. it does not require any operator to perform manual actions in real-time. Another advantage with the system according to the present invention is that it is "self learning", i.e. the initiation/the training of the system is performed automatically. Yet another advantage with the system according to the present invention is that it takes into account that different animals can have different sizes, not only different lengths. This permits the milking location to be adjusted for each individual animal. Consequently, any animal of any size is thus prevented from interfering with the milking, e.g. by moving in such a way that the teat cups will fall off.

A further advantage in this context is achieved if the control means is operable to move the at least one movable confining means between predetermined positions. This gives the animal a possibility to move between different movements of the at least one movable confining means.

Furthermore, it is an advantage in this context if the system also comprises a recognitions device provided at the milking location, and connected to the control means, which recognition device is operable to automatically identify the animal entered into/present in the milking location. This makes it possible to is identify each animal entered into/present in the milking location.

A further advantage in this context is achieved if the system also comprises a to the control means connected third sensor means operable to detect a position value of at least one part of the at least one confining means, and a to the control means connected memory means operable to store, in connection with the identity of an animal, the final position value of the at least one movable confining means for the animal when adjustment of the milking location is finished. Furthermore, the control means is operable to move the at least one confining means by making use of the final position value stored in the memory means. By making use of stored final position values, the system gets faster.

Furthermore, it is an advantage in this context if the control means also is operable to update the final position value in the memory means during a following automatic adjustment. In this way, the system can keep track of the fact that the size of an animal changes with time.

The invention also refers to a method for automatic initiation of a milking location for an animal by automatic adjustment of at least one interior dimension of the milking location according to claim 21. The milking location comprises an enclosure formed by confining means, whereby at least one of the confining means is movable. The method comprises the steps:

to detect the presence of an animal in the milking location with the aid of a first sensor means;

to detect a part of the animal with the aid of a second sensor means; and with the aid of a control means connected to the first sensor means, and the second sensor means, to move the at least one movable confining means iteratively in steps until the second sensor means detects that the position of the animal is within desired limits.

An advantage with the method according to the present invention is that it is automatic, i.e. it does not require any operator to perform manual actions in real-time. Another advantage with the method according to the present invention is that it is "self learning", i.e. the initiation/the training of the method is performed automatically. Yet another advantage with the method according to the present invention is that it takes into account that different animals can have different sizes, not only different lengths. This permits the milking location to be adjusted for each individual animal. Consequently, any animal of any size is thus prevented from interfering with the milking, e.g. by moving in such a way that the teat cups will fall off.

A further advantage in this context is achieved if the moving step is performed by moving the at least one confining means between predetermined positions. This gives the animal a possibility to move between different movements of the at least one movable confining means.

The above mentioned problems can also be solved by at least one computer program product. The at least one computer program product is directly loadable into the internal memory of at least one digital computer. The at least one computer program product comprises software code portions for performing the steps of one of the methods according to the present invention, when the at least one product is run on the at least one computer.

An advantage with the at least one computer program product according to the present invention is that it is automatic, i.e. it/does not require any operator to perform manual actions in real-time. Another advantage with the product according to the present invention is that it is "self-learning", i.e. the initiation/the training of the product is performed automatic. Yet another advantage with the product according to the present invention is that it takes into account that different animals can have different sizes, not only different lengths. This permits the milking location to be adjusted for each individual animal. Consequently, any animal of any size is thus prevented from interfering with the milking, e.g. by moving in such a way that the teat cups will fall off.

It will be noted that the term "comprises/comprising" as used in this description is intended to denote the presence of a given characteristic, step or component, without excluding the presence of one or more other characteristic features, integers, steps, components or groups thereof.

Embodiments of the invention will now be described with a reference to the accompanying drawings, in which:

DETAILED DESCRIPTION OF REFERRED EMBODIMENTS

Figure 1:
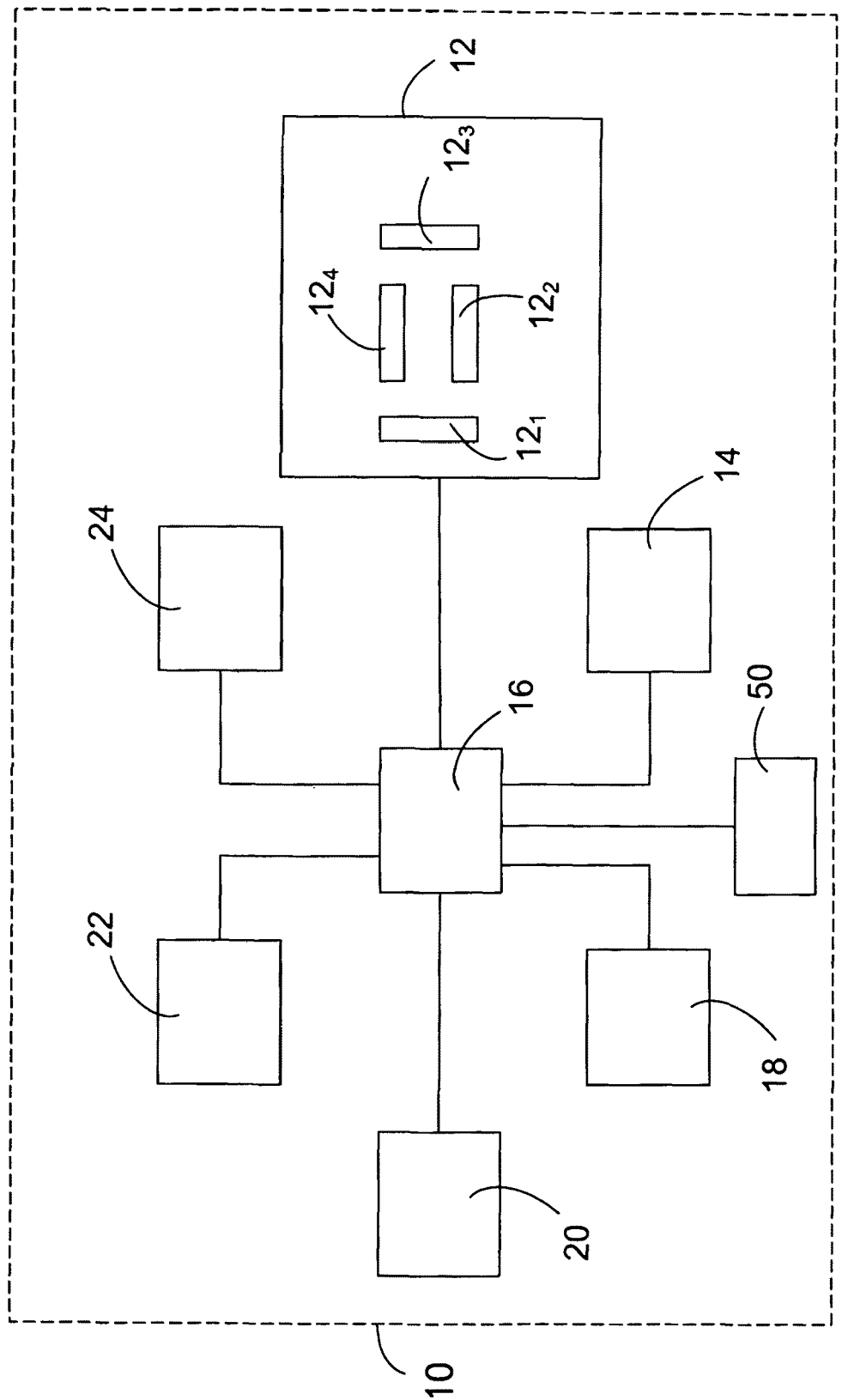
FIG. 1 shows a block diagram of a system for automatic adjustment of at least one interior dimension of a milking location for an animal according to the present invention.

In FIG. 1 there is disclosed a system 10 for automatic adjustment of a milking location 12 for an animal according to the present invention. The milking location 12 comprises an enclosure formed by n confining means $12_1$-$12_n$, wherein n is an integer and $n \geq 1$. In FIG. 1 there is only disclosed four confining means $12_1$-$12_4$, and at least one of the confining means $12_1$-$12_4$ is movable. The system 10 comprises a first sensor means 14 operable to detect the presence of an animal in the milking location 12. The system 10 also comprises a control means 16 connected to the first sensor means 14. The control means 16 is operable, when the presence of an animal in the milking location 12 is detected, to move the at least one movable confining means $12_1$-$12_4$ stepwise, in order to adjust the at least one interior dimension of the milking location 12 to the animal.

Furthermore, FIG. 1 also discloses a system 10 operable to automatically initiate a milking location 12 for an animal by automatic adjustment of at least one interior dimension of the milking location 12. The milking location 12 comprises an enclosure formed by n confining means $12_1, \ldots, 12_n$, wherein n is an integer, and $n \geq 1$. In FIG. 1 there is only disclosed four confining means $12_1$-$12_4$, and at least one of the confining means $12_1$-$12_4$ is movable. The system 10 comprises a first sensor means 14 operable to detect the presence of an animal in the milking location 12. The system 10 also comprises a control means 16 connected to the first sensor means 14. Furthermore, the system 10 also comprises a second sensor means 20 connected to the control means 16. The second sensor means 20 is operable to detect a part of the animal. The control means 16 is operable, when the presence of an animal in the milking location 12 is detected, to move the at least one movable confining means $12_1$-$12_4$ iteratively in steps until the second sensor means 20 detects that the position of the animal is within desired limits.

Furthermore, the control means 16 is operable to move the at least one movable confining means $12_1$-$12_4$ between predetermined positions.

As also is apparent in FIG. 1, the system 10 also comprises a recognition device 18 provided at the milking location 12. The recognition device 18 is connected to the control means 16, and is operable to automatically identify the animal entered into/present in the milking location 12.

Furthermore, the system 10 also comprises a second sensor means 20 connected to the control means 16. The second sensor means 20 is operable to detect a part of the animal. When the presence of an animal in the milking location 12 is detected, the control means 16 is operable to move the at least one movable confining means $12_1$-$12_4$ iteratively in steps until the second sensor means 20 detects that the position of the animal is within desired limits.

Furthermore, the system 10 also comprises a third sensor means 50 connected to the control means 16. The third sensor means 50 is operable to detect a position value of at least one part of the at least one movable confining means 12$_1$-12$_4$. As also is apparent in FIG. 1, the system 10 also comprises a memory means 22 connected to the control means 16. The memory means 22 is operable to store, in connection with the identity of an animal, the final position value of the at least one movable confining means 12$_1$-12$_4$ for the animal when adjustment of the milking location 12 is finished.

Furthermore, the control means 16 is operable to move the at least one movable confining means 12$_1$-12$_4$ by making use of the final position value stored in the memory means 22. In this way the system 10 can be faster, by making use of so called historical data about the animals.

The control means 16 is also operable to update the final position value in the memory means 22 during a following automatic adjustment.

The milking location 12 can for example be situated in one of the following: an automatic milking station, a rotary herringbone parlour, a parallel parlour, a tandem parlour, a rotary parlour or a herringbone parlour. (See FIG. 3-6.)

Preferably, one movable confining means 12$_1$-12$_4$ has influence on the length of the enclosure.

Preferably, one movable confining means 12$_1$-12$_4$ has influence on the width of the enclosure.

According to another embodiment of the system 10, the at least one movable confining means 12$_1$-12$_4$ is moved in dependence of the detected position value/values.

As also is apparent in FIG. 1, the system 10 also comprises a comparator means 24 connected to the control means 16. The third sensor means 50 detects the position value of the at least one part of the at least one confining means 12$_1$-12$_4$ in the milking location 12 continuously. When a position value is stable during a predetermined time interval it is established as an actual position value. The comparator means 24 is operable to compare the actual position value with a desired position value of the at least one part of the at least one confining means 12$_1$-12$_4$ in the milking location 12, resulting in a difference position value. Thereafter, the control means 16 is operable to move the at least one confining means 12$_1$-12$_4$ in dependence of a new difference position value until the difference position value is within predetermined limits.

According to one embodiment of the system 10, the first and second sensor means 14, 20 each is a pressure sensor.

According to another embodiment of the system, the first and second sensor means 14, 20 each is a photoelectric sensor.

According yet another embodiment of the system 10, one of the movable confining means 12$_1$-12$_4$ is a food trough.

According to a further embodiment of the system 10, the first to third sensor means 14, 20, 50 are visual detection means 30 (see FIG. 2) directed toward the animal when being located in the milking location 12.

Figure 2:
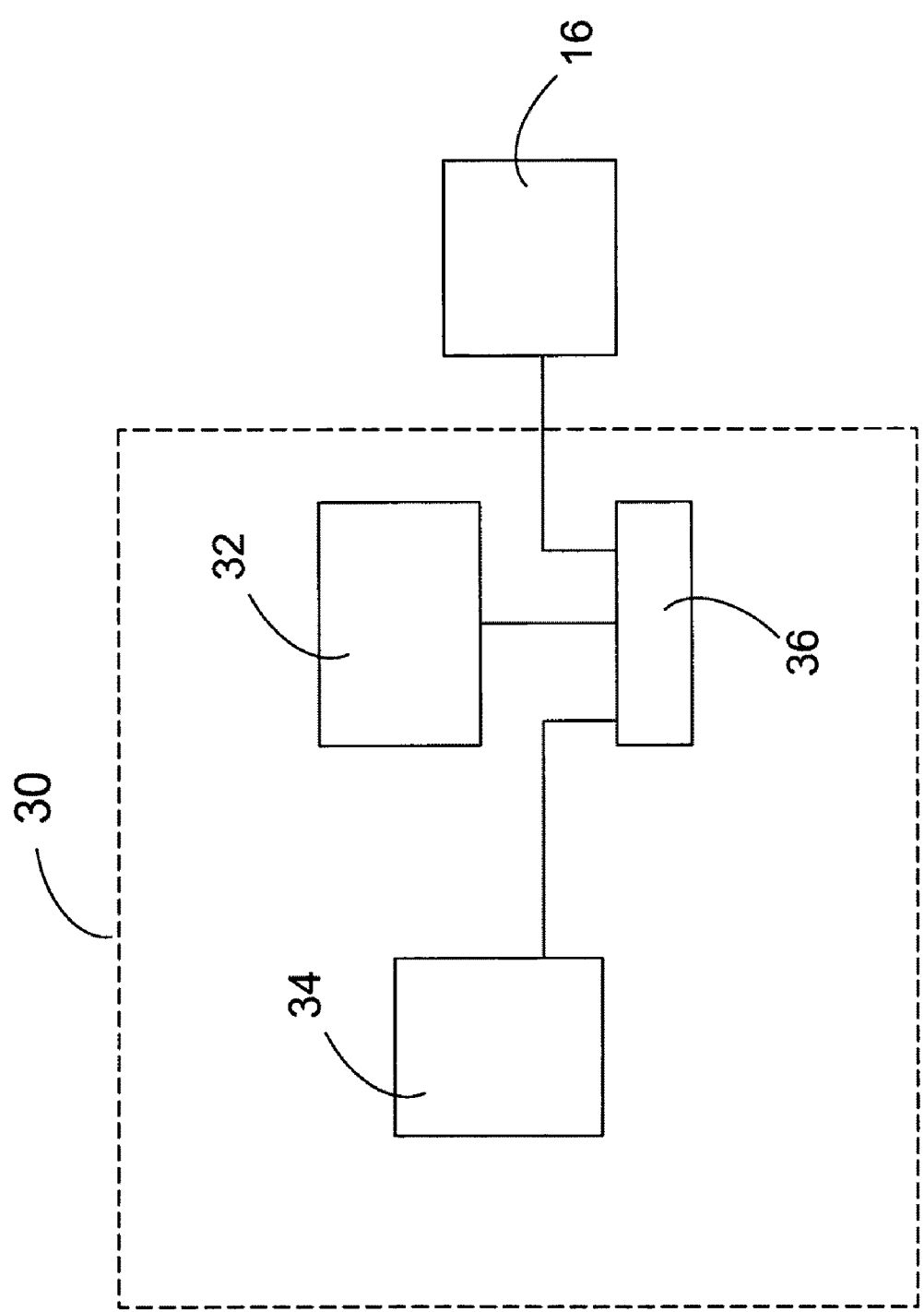
FIG. 2 shows a block diagram of a visual detection means which can be a part of the system disclosed in FIG. 1.

In FIG. 2 there is disclosed a block diagram of the visual detection means 30, which can be a part of the system 10 disclosed in FIG. 1. As is apparent in FIG. 2, the visual detection means 30 comprises a multipurpose network camera 32 and a server 34 provided with image processing software. The network camera 32 and the server 34 are both connected to a network switch 36, which in turn is connected to the control means 16. The network camera 32 covers a large detection area, and has a low detection frequency. The server 34 is connected to the control means 16 via a standard wired or wireless connection, and is provided to communicate with the control means 16 via a standard network protocol.

It is pointed out that when a camera is used in the system 10 according to the present invention, said camera can work both as the first sensor means 14, and the second sensor means 20.

An advantage with this system 10 according to the present invention is that the system 10 is "self-learning", i.e. is initiated automatically, when the system 10 does not have any historical data about the animals, or when the historical data is considered to be incorrect. It is pointed out that the system 10 is not initiated every time. If the system 10 does have historical data about the animals, the system 10 makes use of these historical data.

In one embodiment of the system 10 according to the present invention, one of the movable confining means 12$_1$-12$_4$ is a food trough, and the second sensor means 20 is a sensor arranged on the rear confining means, and operable to sense the rear part of the animal. In this embodiment, the food trough is moved and the sensor is read until the position of the animal is within the desired limits. This is repeated in an iterative process which has to be performed very slowly, because the animal must have time to move between the different movements of the food trough.

Figure 3:
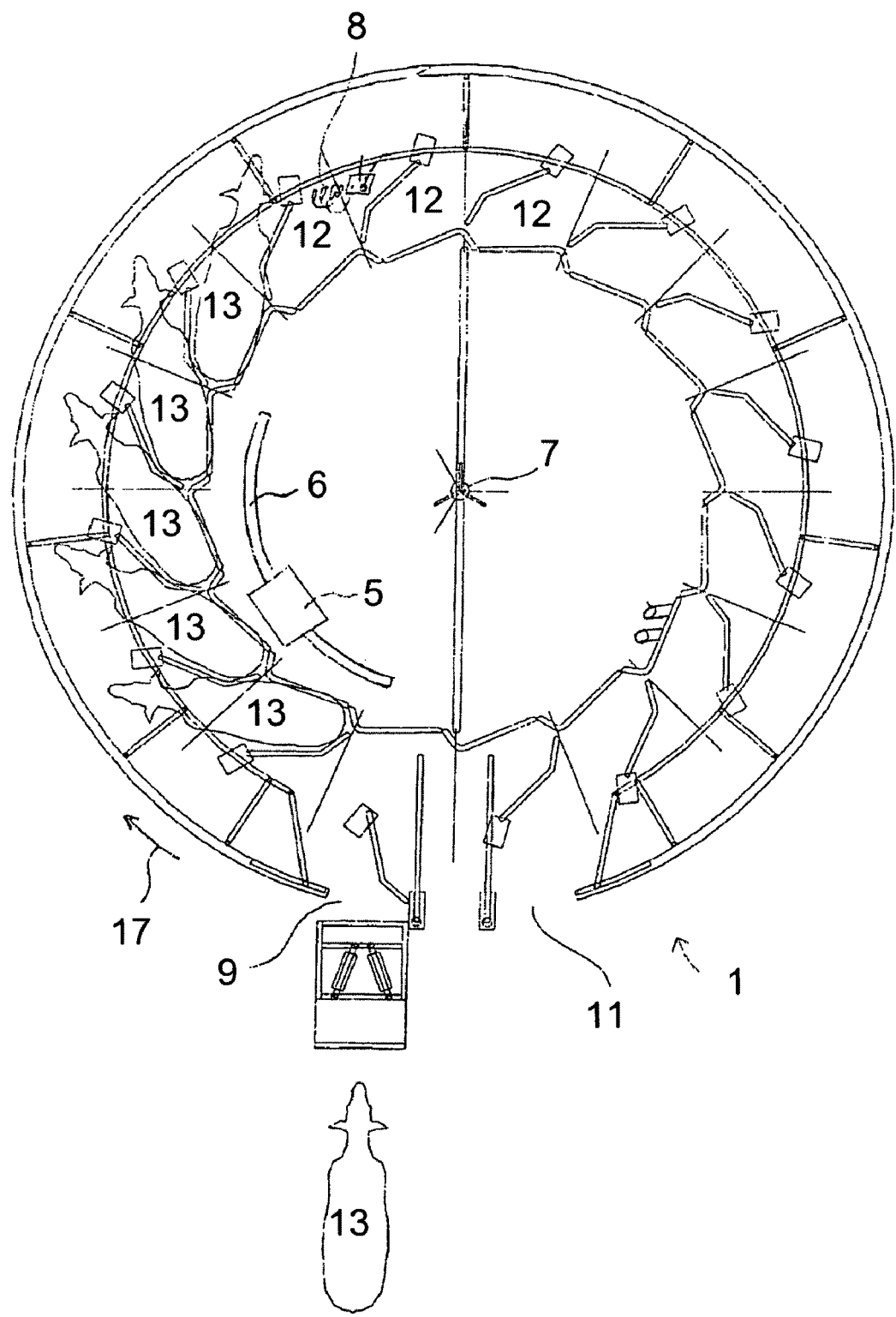
FIG. 3 shows schematically a rotary herringbone parlour, wherein the system according to the present invention can be used.

In FIG. 3 there is schematically disclosed a rotary herringbone parlour 1, having a number of milking locations 12 for e.g. cows to be milked, which milking locations 12 are annularly arranged around a rotational axis 7. In FIG. 3 there is shown five cows 13 already located in the milking locations 12, and one cow 13 ready to enter the rotary herringbone parlour 1 via the entrance gate 9. The rotary herringbone parlour 1 also has an exit gate 11. A robot 5 is arranged between the milking locations 12 and the rotational axis 7. The robot 5 is movable along a rail 6, which defines an arc, and the robot 5 is arranged to arrange the teat cups 8 on the cows 13 in the milking locations 12. The rotary herringbone parlour 1 is rotated in the clockwise direction, as is indicated by the arrow 17.

Figure 4:
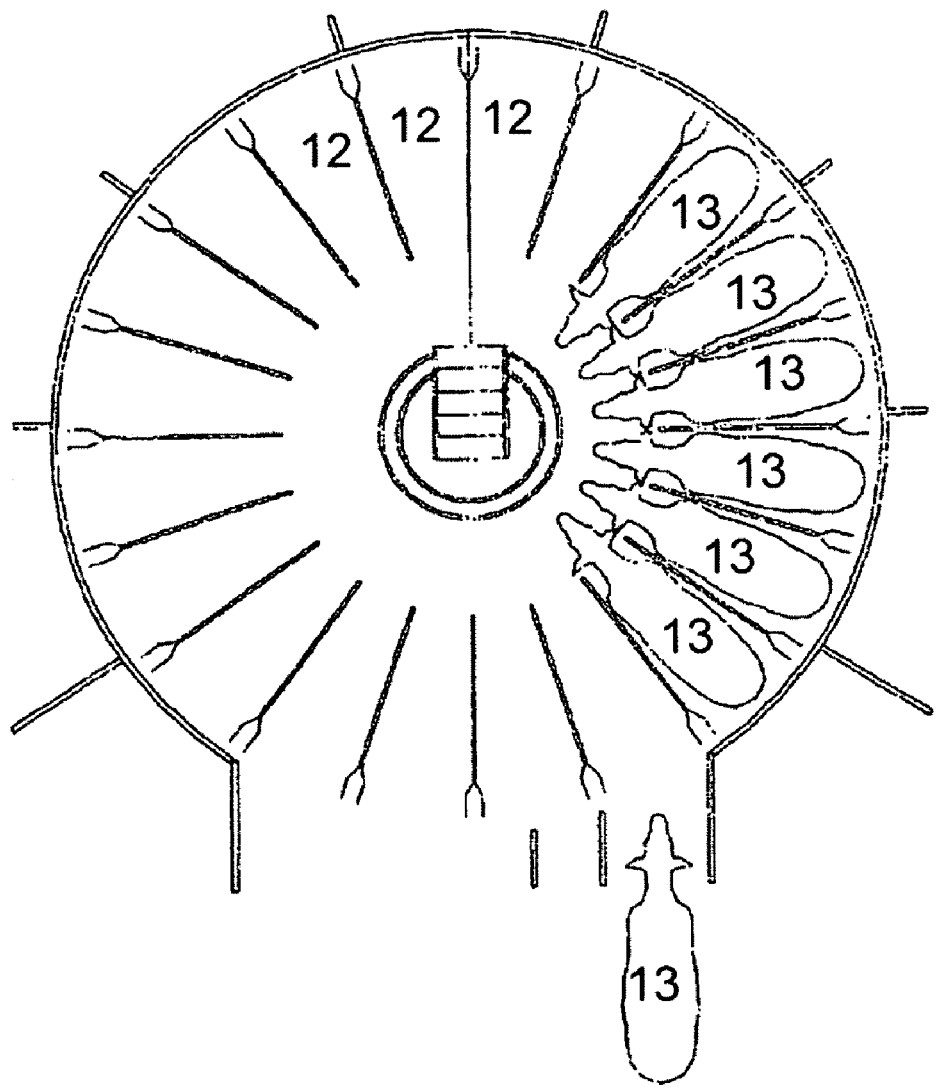
FIG. 4 shows schematically a rotary parlour, wherein the system according to the present invention can be used.

In FIG. 4 there is schematically disclosed a rotary parlour, wherein the system 10 according to the present invention can be used. In this case, both the milking locations 12 and the cows 13 are arranged parallel to each other and radially.

Figure 5:
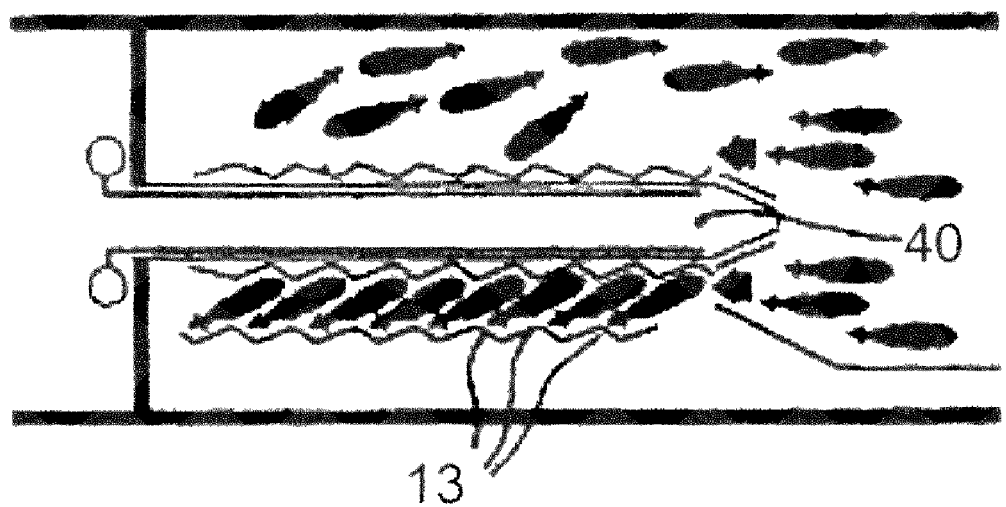
FIG. 5 shows schematically a herringbone parlour, wherein the system according to the present invention can be used.

In FIG. 5 there is schematically disclosed a herringbone parlour, wherein the system 10 according to the present invention can be used. The cows 13 for milking are place side by side along a pit 40 in a herringbone configuration.

Figure 6:
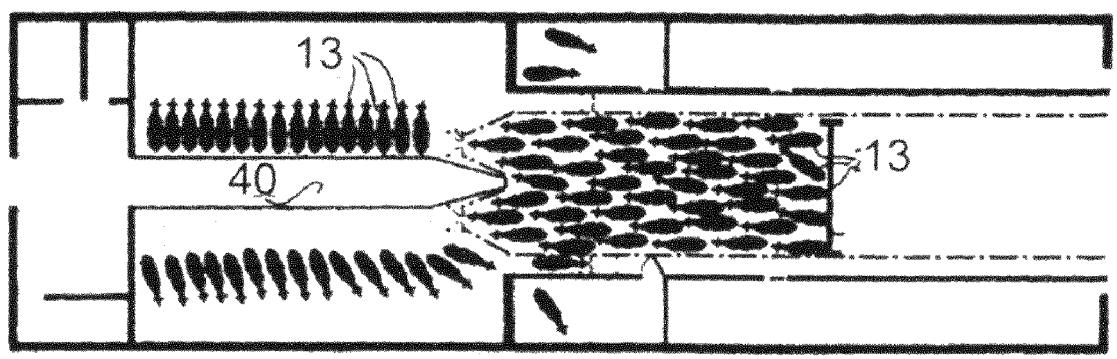
FIG. 6 shows schematically a parallel parlour, wherein the system according to the present invention can be used.

In FIG. 6 there is disclosed schematically a parallel parlour, wherein the system 10 according to the present invention can be used. In this case, the cows 13 for milking are place parallel to each other along a pit 40. The cows 13 are arranged in a direction at right angles to the longitudinal direction of the pit 40.

Figure 7:
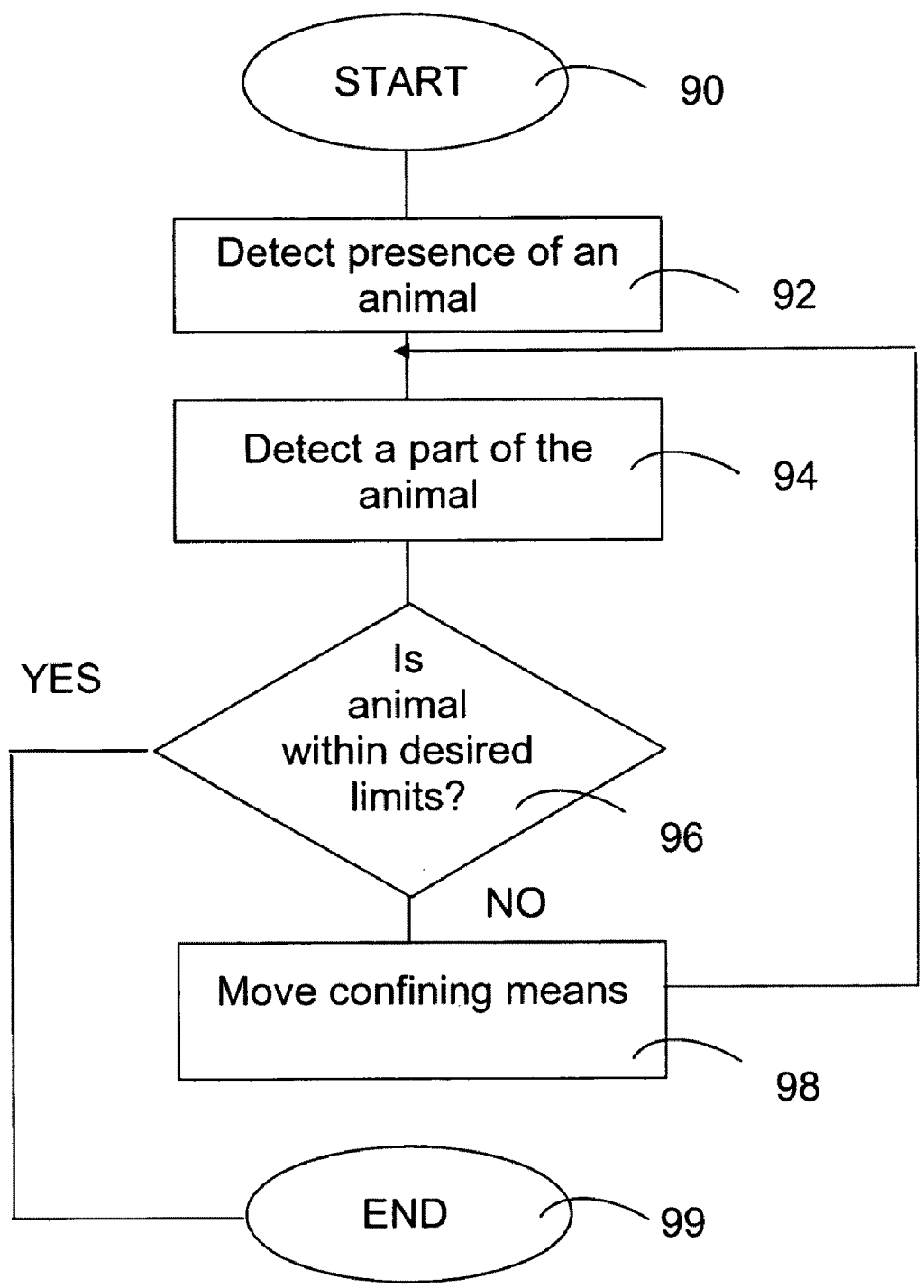
FIG. 7 is a flow chart of the method for automatic initiation of a milking location for an animal by automatic adjustment of at least one interior dimension of the milking location according to the present invention.

In FIG. 7 there is disclosed a flow chart of the method for automatic initiation of a milking location 12 for an animal by automatic adjustment of at least one interior dimension of the milking location 12. The milking location 12 comprises an enclosure formed by n confining means 12$_1$-12$_n$, wherein n is an integer, and n≧1. At least one of the confining means 12$_1$-12$_4$ (see FIG. 1) is movable. The method begins at block 90. The method continues, at block 92, with the step: to detect the presence of an animal in the milking location 12 with the aid of a first sensor means 14 (see FIG. 1). Thereafter, the method continues, at block 94, with the step: to detect a part of the animal with the aid of a second sensor means 20. The method continues, at block 96, to ask the question: Is the animal within the desired limits? If the answer is affirmative, the method is completed, at block 99. If, on the other hand, the answer is negative, the method continues, at block 98, with the step: with the aid of a control means 16 connected to the first sensor means 14, and the second sensor means 20, to move the at least one movable confining means $12_1$-$12_4$. Thereafter, the step according to the block 94 is performed again. According to another embodiment of the method, the moving step, block 96, is performed by moving the at least one movable confining means $12_1$-$12_4$ between predetermined positions.

Furthermore, the method also comprises the step:
to automatically identify the animal entered into/present in the milking location 12.

According to another embodiment of the method, it also comprises the steps:
to detect a part of the animal with the aid of a second sensor means 20; and
with the aid of the control means 16, also connected to the second sensor means 20, to move the at least one movable confining means $12_1$-$12_4$ iteratively in steps until the second sensor means 20 detects that the position of the animal is within desired limits.

According to yet another embodiment of the method, it also comprises the steps:
to detect a position value of at least one part of the at least one confining means $12_1$-$12_4$ with the aid of a third sensor means 50; and
to move the at least one movable confining means $12_1$-$12_4$ in dependence of the detected position value.

Furthermore, the method also comprises the steps:
to detect the position value of the at lest one part of the at least one confining means $12_1$-$12_4$ in the milking location 12 continuously with the aid of the third sensor means 50;
when a position value is stable during a predetermined time interval, to establish it as an actual position value;
with the aid of a comparator means 24 connected to the control means 16, to compare the actual position value with a desired position value of the at least one art of the at least one confining means $12_1$-$12_4$ in the milking location 12 resulting in a difference position value; and
with the aid of the control means 16 to move the at least one confining means $12_1$-$12_4$ in dependence of a new difference position value until the difference position value is within predetermined limits.

Figure 8:
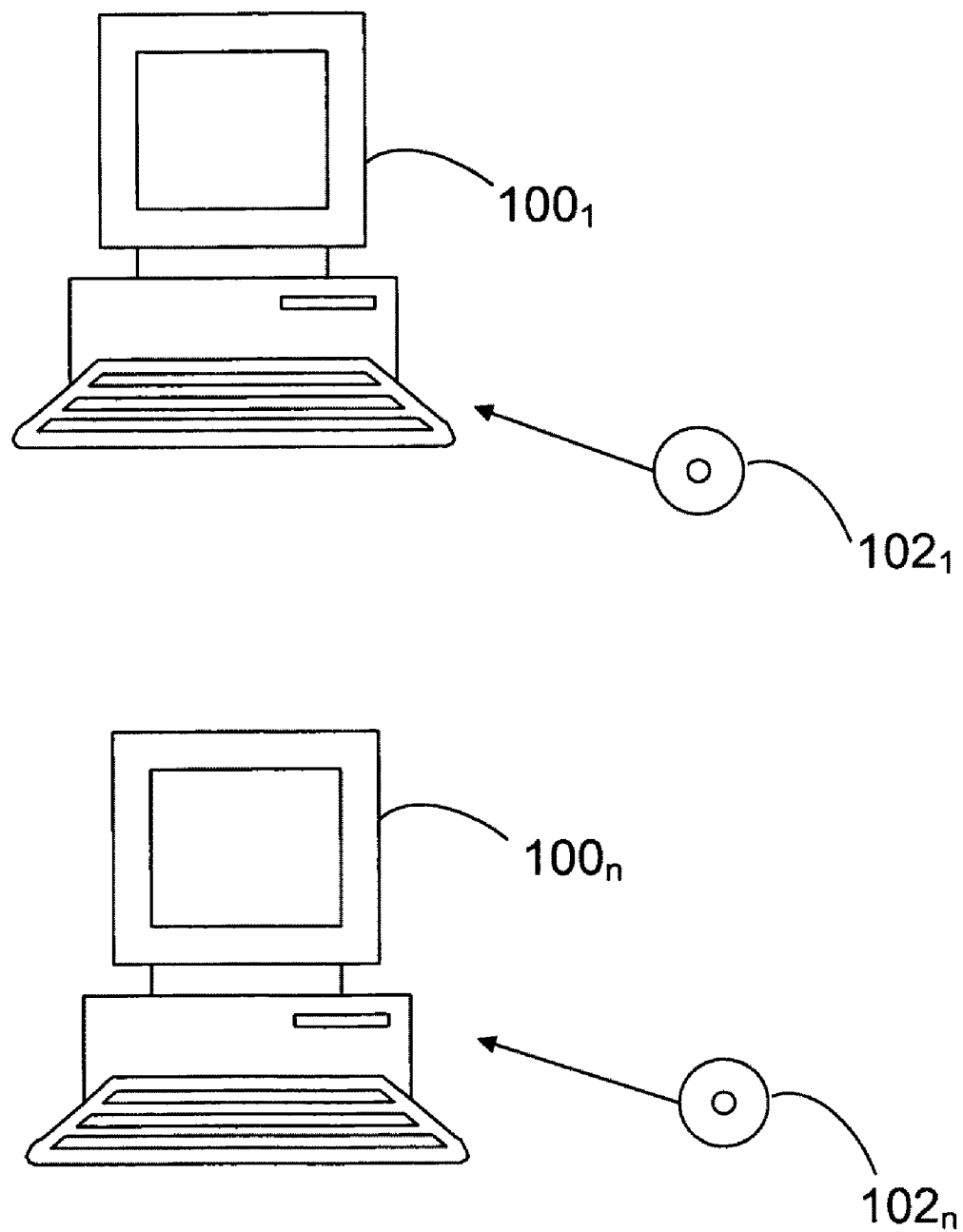
FIG. 8 schematically shows a number of computer program products according to the present invention.

In FIG. 8 there is disclosed a schematic diagram of some computer program products according to the present invention. There is disclosed n different digital computers $100_1, \ldots, 100_n$, wherein n is an integer. There is also disclosed n different computer program products $102_1, \ldots, 102_n$, here showed in the form of compact discs. The different computer program products $102_1, \ldots, 102_n$ are directly loadable into the internal memory of the n different digital computers $100_1, \ldots, 100_n$. Each computer program product $102_1, \ldots, 102_n$ comprises software code portions for performing some or all the steps of FIG. 7 when the product $102_1, \ldots, 102_n$ is run on said computer(s) $100_1, \ldots, 100_n$. Said computer program products $102_1, \ldots, 102_n$ can e.g. be in the form of floppy disks, RAM disks, magnetic tapes, opto magnetical disks or any other suitable products.

The invention is not limited to the embodiments described in the foregoing. It will be obvious that many different modifications are possible within the scope of the following claims.

The invention claimed is:

1. A system for automatic adjustment of an enclosure for milking an animal, the system comprising:
at least one barrier configured to form the enclosure, the barrier being movable;
a first sensor configured to detect a presence of the animal in the enclosure;
a controller connected to the first sensor, the controller configured to move the barrier stepwise so as to adjust an interior dimension of the enclosure to the animal when the first sensor detects the presence of the animal in the enclosure;
a second sensor connected to the controller, the second sensor configured to detect a position value of the barrier;
a memory connected to the controller, the memory configured to store an identity of the animal and a final position value of the barrier after the controller has completed stepwise movement of the barrier, the identity of the animal and the final position value of the barrier forming the enclosure occupied by the animal being associated in the memory, the controller being configured to move the barrier based on the final position value stored in the memory.

2. The system of claim 1, wherein the first sensor is configured to detect a position of the animal in the enclosure, and wherein the controller is configured to move the barrier stepwise until the first sensor detects the position of the animal is a desired position.

3. The system of claim 1, further comprising:
a third sensor connected to the controller, the third sensor being configured to detect a position of the animal in the enclosure, the controller being configured to move the barrier stepwise until the first sensor detects the position of the animal is a desired position.

4. The system of claim 1, wherein the controller is configured to move the barrier between predetermined positions.

5. The system of claim 1, further comprising:
a recognition system connected to the controller, the recognition system configured to provide the identity of the animal in the enclosure.

6. The system of claim 1, wherein the controller is configured to store the final position in the memory and to subsequently move the barrier based on the final position value previously stored in the memory.

7. The system of claim 1, wherein the enclosure is at a milking location in one of an automatic milking station, a rotary herringbone parlour, a parallel parlour, a tandem parlour, a rotary parlour, and a herringbone parlour.

8. The system of claim 1, wherein the controller is configured to move the barrier in a length-wise direction of the enclosure.

9. The system of claim 1, wherein the controller is configured to move the barrier in a width-wise direction of the enclosure.

10. The system of claim 1, wherein the first sensor is configured to detect a position of the animal in the enclosure, and wherein the controller is further configured to move the barrier based on the position of the animal in the enclosure.

11. The system of claim 10, further comprising:
a comparator connected to the controller, the second sensor being configured to continuously detect a position of the barrier and provide the final position value of the barrier when the continuously detecting detects that the barrier has not moved during a predetermined time interval, the comparator being configured to compare the final position value with a desired position value, the controller being configured to move the barrier following the comparison such that the final position value matches the desired position value.

12. The system of claim 1, wherein the first sensor and the second sensor are visual sensors positioned in a line of sight of the animal in the enclosure.

13. The system of claim 12, wherein the visual sensors include a multipurpose network camera and a server configured to execute image processing software stored on the server, and wherein the server is communicatively connected to the controller via a standard network protocol.

14. The system of claim 1, wherein the first sensor and the second sensor are pressure sensors.

15. The system of claim 1, wherein the first sensor and the second sensor are photoelectric sensors.

16. The system of claim 1, wherein the barrier includes a food trough.

17. A method of automatically adjusting an enclosure for milking an animal, the method comprising:
   detecting a presence and an identity of the animal in the enclosure;
   detecting a position of at least one barrier configured to form the enclosure, the barrier being movable;
   stepwise moving the barrier so as to adjust an interior dimension of the enclosure to the animal in the enclosure;
   storing the identity of the animal and a final position value of the barrier after the stepwise moving the barrier, the identity of the animal and the final position value of the barrier forming the enclosure occupied by the animal being stored in association with each other; and
   moving the barrier based on the stored final position value.

18. The method of claim 17, further comprising:
   determining a position of the animal in the enclosure, wherein the stepwise moving moves the barrier until the determined position of the animal is a desired position.

19. The method of claim 17, wherein the detecting the presence and the detecting the position are performed by at least one sensor connected to a controller, wherein the stepwise moving and the moving are performed by the controller, and wherein the storing stores the identity and the final position in a computer memory.

20. The system of claim 17, wherein the moving moves the barrier between predetermined positions.

21. The system of claim 17, wherein the detecting the position of the barrier continuously detects the position of the barrier during the stepwise moving, and wherein the storing stores the final position value of the barrier when the continuously detecting detects that the barrier has not moved during a predetermined time interval, and wherein the moving includes comparing the final position value with a desired position value and moving the barrier following the comparison such that the final position value matches the desired position value.

22. A system for automatic adjustment of an enclosure for milking an animal, the system comprising:
   at least one barrier configured to form the enclosure, the barrier being movable;
   at least one sensor configured to detect a presence of the animal in the enclosure and configured to detect a position value of the barrier;
   a controller connected to the sensor, the controller configured to move the barrier stepwise so as to adjust an interior dimension of the enclosure to the animal when the first sensor detects the presence of the animal in the enclosure;
   a memory connected to the controller, the memory configured to store an identity of the animal and a final position value of the barrier after the controller has completed stepwise movement of the barrier, the identity of the animal and the final position value of the barrier being associated in the memory, the controller being configured to move the barrier based on the final position value stored in the memory.

23. The system of claim 22, wherein the sensor is configured to detect a position of the animal in the enclosure, and wherein the controller is configured to move the barrier stepwise until the sensor detects the position of the animal is a desired position.

* * * * *